(12) United States Patent
Smith et al.

(10) Patent No.: US 10,673,852 B2
(45) Date of Patent: Jun. 2, 2020

(54) SELF-ORGANIZING TRUSTED NETWORKS

(71) Applicant: McAfee, Inc., Santa Clara, CA (US)

(72) Inventors: Ned M. Smith, Beaverton, OR (US);
Venkata Ramanan Sambandam,
Sunnyvale, CA (US)

(73) Assignee: McAfee, LLC, Santa Clara, CA (US)

( * ) Notice: Subject to any disclaimer, the term of this patent is extended or adjusted under 35 U.S.C. 154(b) by 339 days.

(21) Appl. No.: 14/581,333

(22) Filed: Dec. 23, 2014

(65) Prior Publication Data

US 2016/0182518 A1 Jun. 23, 2016

(51) Int. Cl.
*H04L 29/06* (2006.01)
*G06F 15/16* (2006.01)
*G06F 7/04* (2006.01)

(52) U.S. Cl.
CPC .......... *H04L 63/10* (2013.01); *H04L 63/0272* (2013.01); *H04L 63/045* (2013.01); *H04L 63/205* (2013.01)

(58) Field of Classification Search
CPC ...................................................... H04L 63/20
USPC ............................................................. 726/3
See application file for complete search history.

(56) References Cited

U.S. PATENT DOCUMENTS

| | | | | |
|---|---|---|---|---|
| 6,314,459 B1 * | 11/2001 | Freeman | ............. | H04L 12/2805 709/220 |
| 7,340,500 B2 * | 3/2008 | Traversat | ............... | G06F 9/4416 709/201 |
| 8,316,438 B1 * | 11/2012 | Bush | ........................ | H04L 12/66 726/22 |
| 8,838,977 B2 | 9/2014 | Winograd et al. | | |
| 8,880,489 B2 * | 11/2014 | Basu | .................. | G06F 17/30864 707/705 |
| 2004/0187133 A1 * | 9/2004 | Weisshaar | ............... | H04L 29/06 718/100 |
| 2005/0005116 A1 * | 1/2005 | Kasi | ........................ | G06Q 10/10 713/170 |
| 2007/0033167 A1 * | 2/2007 | Basu | .................. | G06F 17/30864 |
| 2008/0130639 A1 * | 6/2008 | Costa-Requena | ......... | G06F 8/65 370/389 |
| 2009/0210932 A1 * | 8/2009 | Balakrishnan | .......... | H04W 4/02 726/5 |
| 2010/0017368 A1 * | 1/2010 | Mao | ........................ | G06F 9/465 707/E17.014 |
| 2011/0035650 A1 * | 2/2011 | Jardine-Skinner | ......... | G06F 17/30011 715/205 |

(Continued)

OTHER PUBLICATIONS

Shared network infrastructure using standard services; Tempered Networks Technical White Paper—p. 1-12.*

(Continued)

*Primary Examiner* — Monjur Rahim
(74) *Attorney, Agent, or Firm* — Hanley, Flight & Zimmerman, LLC

(57) ABSTRACT

Organizing a trusted network includes receive, by a local device, a message from a first remote trusted device identifying a first service hosted by the first remote trusted device, wherein the local device and the first remote trusted device are in a trusted network. Organizing a trusted network also includes indexing, by the local device, the first service in a registry comprising services available to the local device and a location of each service available, wherein the registry is local to the local device.

25 Claims, 7 Drawing Sheets

(56) References Cited

U.S. PATENT DOCUMENTS

| | | | |
|---|---|---|---|
| 2011/0246748 A1* | 10/2011 | Talwar | G06F 9/5077 |
| | | | 712/30 |
| 2013/0159723 A1* | 6/2013 | Brandt | G06F 21/6218 |
| | | | 713/176 |
| 2014/0056220 A1* | 2/2014 | Poitau | H04W 76/14 |
| | | | 370/328 |
| 2014/0215580 A1* | 7/2014 | Behringer | H04L 63/105 |
| | | | 726/5 |
| 2015/0032578 A1 | 1/2015 | Bicer | |
| 2015/0067118 A1* | 3/2015 | Gatto | G06Q 30/0241 |
| | | | 709/223 |
| 2015/0113627 A1* | 4/2015 | Curtis | H04L 63/06 |
| | | | 726/10 |
| 2015/0319176 A1* | 11/2015 | Yahalom | G06F 21/31 |
| | | | 726/3 |
| 2015/0350177 A1* | 12/2015 | Sharp | H04L 63/08 |
| | | | 726/6 |
| 2018/0288052 A1 | 10/2018 | Sambandam et al. | |

OTHER PUBLICATIONS

United States Patent and Trademark Office, "Non-final Office Action," mailed in connection with U.S. Appl. No. 15/476,542, dated Feb. 26, 2019, 13 pages.

United States Patent and Trademark Office, "Final Office Action," mailed in connection with U.S. Appl. No. 15/476,542, dated Oct. 18, 2019, 21 pages.

\* cited by examiner

SELF-ORGANIZING TRUSTED NETWORKS

TECHNICAL FIELD

Embodiments described herein generally relate to self-organizing trusted networks, and more particularly to generating a trusted network enclave and pooling capabilities among network devices in the trusted network enclave.

BACKGROUND ART

Today's trusted networks are considered to be operating in a trusted mode when all of the network nodes are accounted for and an assessment of their configuration has been made. In some cases, this requires strict control over what devices may connect and when. However, such strict controls have proven to be impractical due to user mobility, device mobility, and the size and complexity of the network. Firewalls and gateway devices are hardened so as to prevent possible attack from the untrusted devices in the network.

Current solutions to provide services across a network are directed to using a centralized approach. Services may be hosted on a central server or a web gateway. However, this approach results in scalability issues as the size of the network expands and contracts.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "network device" can refer to any computer system that is capable of communicating with another computer system across any type of network.

As used herein, the term "trusted device" or "trusted network device" may refer to a network device that is capable of trusted operations. A trusted device may view certain available services hosted by other trusted devices in a trusted network, whereas devices in a network that are not trusted network devices are prevented from accessing the services.

In one or more embodiments, a technique for pooling services in a trusted network includes receiving, from a remote device in the trusted network, a message identifying a service hosted by the remote device, and indexing the service in a local registry. Further, in one or more embodiments, a technique for pooling services in a trusted network may include identifying a remote trusted device, sending a discovery message to the remote trusted device, receiving an acceptance message from the remote trusted device including an available service hosted on the remote trusted device, and indexing the service in a local registry.

Figure 1:
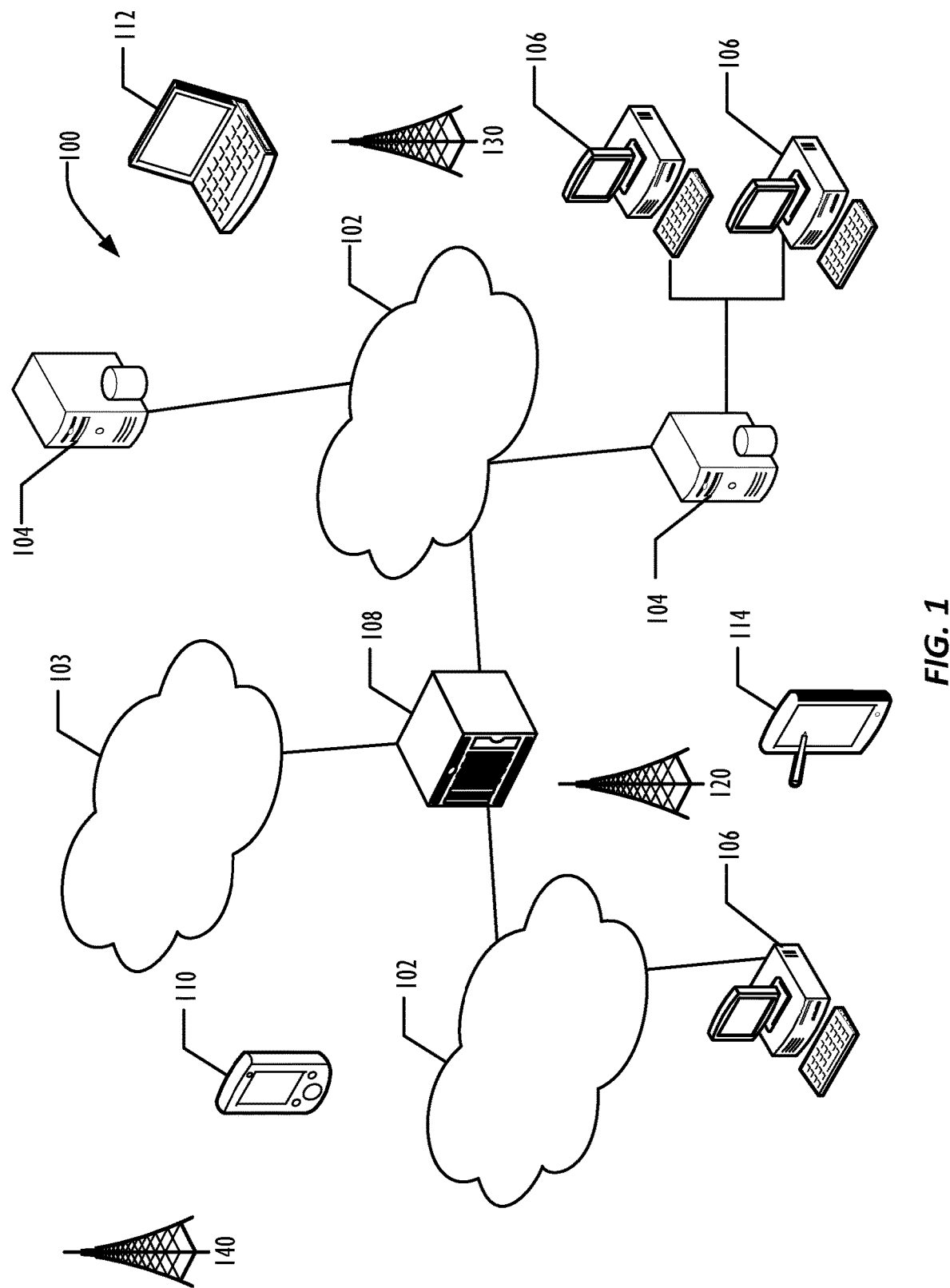
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

In one or more embodiments, one or more of the devices connected across network 102 may support trusted operations. Devices in the network that support trusted operations may be referred to as trusted network devices. Trusted networks may be formed dynamically using trusted discovery which allows trusted network devices to discover other trusted network devices, or trusted network nodes, that support hardening capabilities that handle trusted expansion and contraction of a trusted network. One example is the use of Intel® SGX (Software Guard eXtensions) which is available from the Intel Corporation. (INTEL is a registered trademark of Intel Corporation.) For purposes of the current disclosure, trusted networks may be formed by any means that allow services on trusted devices to remain opaque to network devices that are not part of the trusted network. Whereas untrusted discovery may reveal whether a particular node or network device may support trusted discovery, trusted discovery may be necessary to reveal additional trusted capabilities and services among trusted devices. Some examples of protocols that may be revealed only by trusted discovery include attestation, key agreement, group formation, trusted proxy, and provisioning.

In one or more embodiments, additional policies may be considered in organizing a trusted network. For example, various trusted nodes may provide different levels of security, or trustworthiness. Thus, a particular node may be required to satisfy a certain threshold of trustworthiness in order to host capabilities or services in the trusted network. In one or more embodiments, the hosted services may include security services.

Self-organization and pooling of services in a trusted network may be performed by a trusted network arbiter (TNA) in trusted network devices. In one or more embodiments, the TNA is hardened using Trusted Execution Environment (TEE) technology, such as Intel® SGX, to protect functionality governing the expansion and contraction of the trusted network. The TNA may be responsible for allowing the trusted network device to join a trusted network, placing services hosted by the device into a pool, and utilizing services from the pool. The TNA may cache discovery results regarding services hosted on other trusted network devices to form pools that consist of a registry of network services and capabilities. The generation and utilization of the pooled services will be explained in further detail below.

Figure 2:
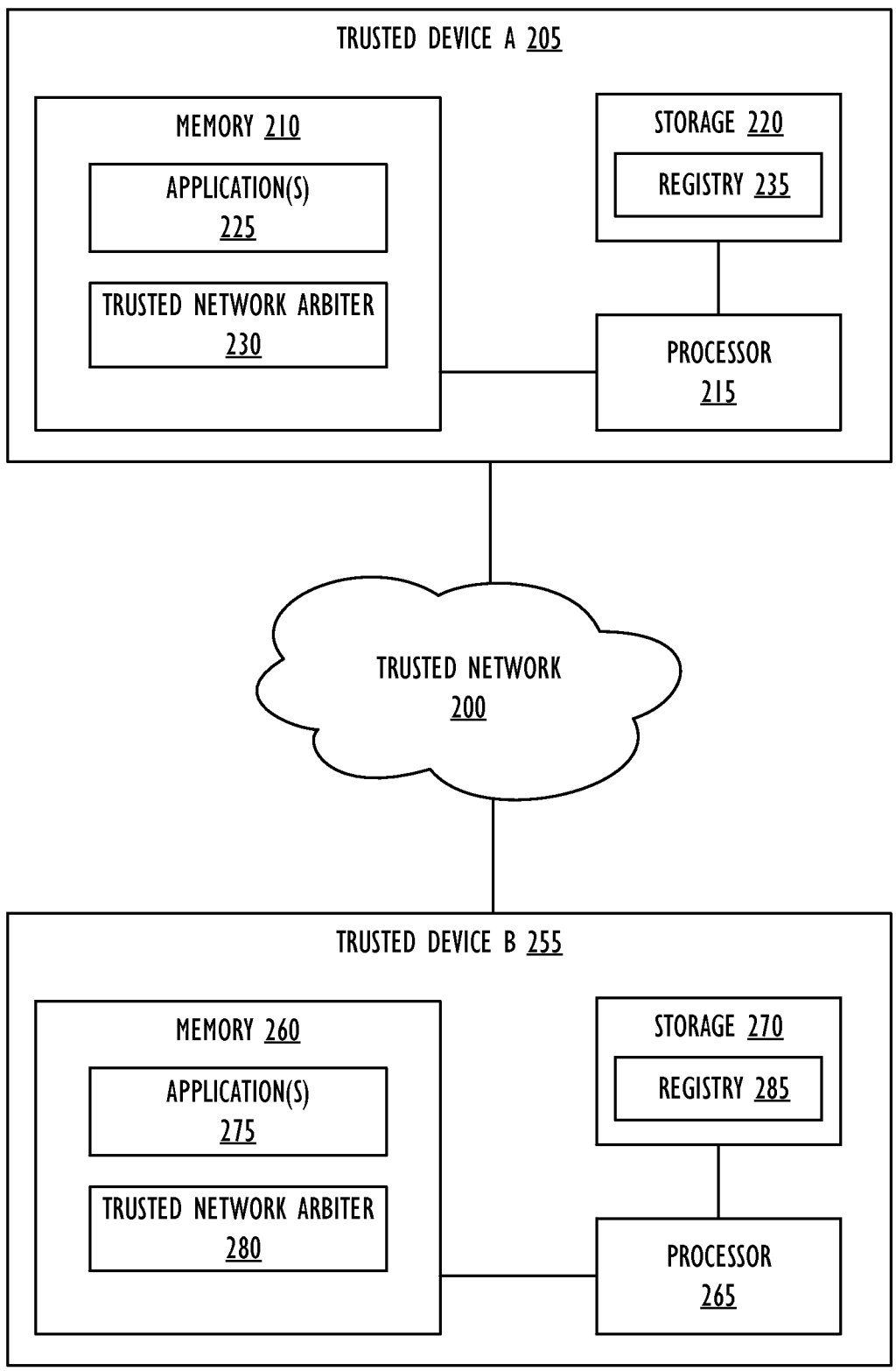
FIG. 2 is a diagram illustrating a system for pooling services in a trusted network according to one or more embodiments.

FIG. 2 is a diagram illustrating a system for pooling services in a trusted network according to one or more embodiments. FIG. 2 includes two trusted devices, including Trusted Device A 205 and Trusted Device B 255. Trusted Device A 205 and Trusted Device B 255 are connected across Trusted Network 200. Trusted Network 200 may be any type of computer network, such as a LAN or a corporate network, which is limited to trusted network devices. For example, Trusted Network 200 may include a subset of the devices included in larger network 102 or 103. Trusted Network 200 may be a network enclave within a larger general network.

Trusted Device A 205 and Trusted Device B 255 include processor core 215 and processor core 265, respectively. Processor core 215 and processor core 265 may be the core for any type of processor, such as a micro-processor, an embedded processor, a digital signal processor (DSP), a network processor, or other device to execute code. Although only one processor core is illustrated in each trusted device in FIG. 2, a processing element may alternatively include more than one of the processor core 215 and processor core 265 illustrated in FIG. 2. Processor core 215 and processor core 265 may each be a single-threaded core or, for at least one embodiment, processor core 215 and processor core 265 may be multithreaded in that they may include more than one hardware thread context (or "logical processor") per core.

Each of Trusted Device A 205 and Trusted Device B 255 includes a memory coupled to the processor. Memory 210 and Memory 260 may be any of a wide variety of memories (including various layers of memory hierarchy) as are known or otherwise available to those of skill in the art. Program code, or instructions, such as the various applications 225 and 275, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, non-transitory medium through which the program code may pass, such as antennas, optical fibers, communications interfaces, etc. Program code may be transmitted in the form of packets, serial data, parallel data, etc., and may be used in a compressed or encrypted format. Memory 210 and Memory 260 may include one or more code instruction(s) to be executed by the processor cores. For example, in Trusted Device A 205, the instructions may include various applications 225, and a trusted network arbiter 230. Similarly, in Trusted Device B 255, the instructions may include various applications 275, and a trusted network arbiter 280. The processor core 215 and processor core 265 follow a program sequence of instructions indicated by the code. In this manner, processor core 215 and processor core 265 are transformed during execution of the code.

Although not illustrated in FIG. 2, a processing element may include other elements on chip with the processor core 215 or 265. For example, a processing element may include memory control logic along with the processor cores. The processing element may include I/O control logic and/or may include I/O control logic integrated with memory control logic. The processing element may also include one or more caches.

Each of Trusted Device A 205 and Trusted Device B 255 includes a storage. Trusted Device A 205 includes storage 220, and Trusted Device B 255 includes storage 270. In Trusted Device A 205, storage 220 includes registry 235, and in Trusted Device B 255, storage 270 includes registry 285. As will be described in further detail below, each registry includes an index of services available to its respective device.

In one or more embodiments, the TNA 230 may communicate with TNA 280 to update registry 235 to include services available to Trusted Device A 205. Similarly, the TNA 280 may communicate with TNA 230 to update registry 285 to include services available to Trusted Device B 255. As an example, TNA 230 may receive a message from TNA 280 identifying a service hosted by Trusted Device B 255. The available service may be included in application(s) 275. In response, TNA 230 may index the service in registry 235. In one or more embodiments, registry 235 includes local and/or remote services available to Trusted Device A 205, and identifies the location of each service. In one or more embodiments, constructing the registry may include pooling network metadata during trusted discovery. Updating the registry will be discussed in further detail below with respect to FIG. 3.

TNA 230 may also receive a request from one of application(s) 225 to utilize a service. For example, it may be preferable to utilize a remote service if the requested service is not available on the local device, if it is determined that utilizing the remote service would be more efficient than utilizing the service locally, or for any reason. TNA 230 may access registry 235 to identify the location of the service. If the service is located remotely, for example if the service is hosted by Trusted Device B 255, TNA 230 coordinates with TNA 280 of Trusted Device B 255 to generate a secure channel. Then, the requesting application may utilize the requested service via the secure channel. Utilizing a remote service will be discussed in further detail below with respect to FIG. 4.

Figure 3:
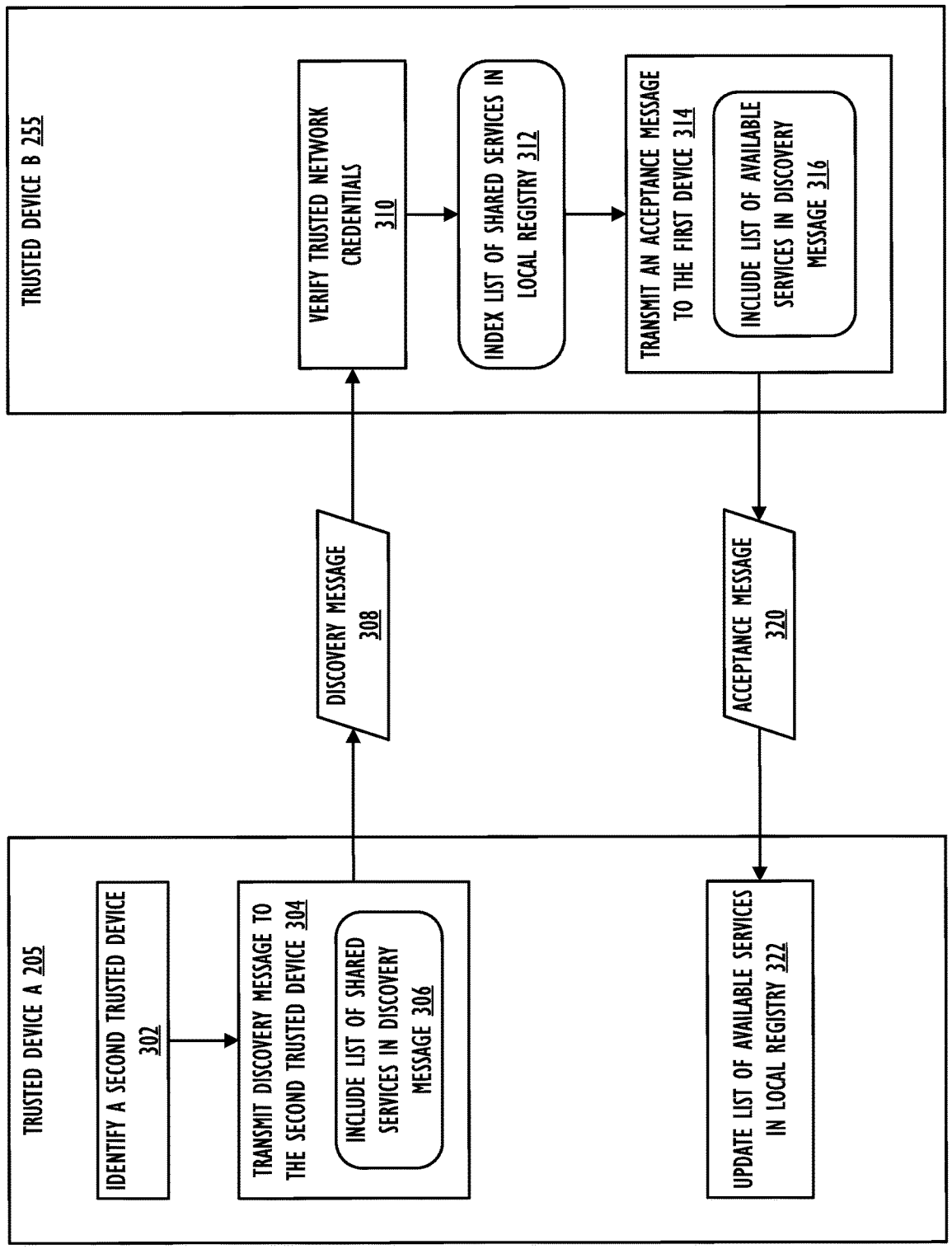
FIG. 3 is a flow diagram illustrating a technique for self-organizing a trusted network, according to one or more embodiments.

FIG. 3 is a flow diagram illustrating a technique for self-organizing a trusted network, according to one or more embodiments. FIG. 3 illustrates updating a local registry during the process of expanding the trusted network, according to one or more embodiments. FIG. 3 includes Trusted Device A 205 and Trusted Device B 255. For purposes of clarity, Trusted Device A 205 and Trusted Device B 255 are depicted in less detail as in FIG. 2. Although each action is depicted as occurring in one or Trusted Device A 205 and Trusted Device B 255, in one or more embodiments, each action is performed by a trusted network arbiter in the respective device.

The flow diagram begins at 302, and Trusted Device A 205 identifies a second trusted device in the network. At 304, Trusted Device A 205 transmits a discover message 308 to Trusted Device B 255. In one or more embodiments, Trusted Device A 205 includes a registry of shared services at 306. For example, Trusted Device A 205 may include services hosted on Trusted Device A 205, if applicable. In addition, Trusted Device A 205 may, at 306, include services available to Trusted Device A 205 that are hosted on a different remote trusted network device. Thus, Trusted Device A 205 may allow Trusted Device B 255 to discover services provided on a third device (not shown). For example, Trusted Device A 205 may have previously discovered other shared services on additional devices during prior discovery involving Trusted Device A 205. In one or more embodiments, discovering services provided by the third device Trusted Device A 205 allows for greater discovery in cases where the third device may frequently be offline or otherwise unavailable for discovery. Thus, Trusted Device B 255 may discover services hosted by a third device during the discovery process with Trusted Device A 205 even when the third device is unavailable for discovery.

At 310, Trusted Device B 255 receives the discovery message 308. At 310, Trusted Device B 255 verifies the trusted network credentials based on a trust policy. For example, Trusted Device B 255 may verify that the security features or services of Trusted Device A 205 satisfy a predetermined threshold of trustworthiness in order to host services in the trusted network. Trustworthiness may be determined based on trusted discovery protocols. Trusted discovery protocols may include, for example, a multi-cast, b-cast or uni-cast message may be used to initiate an Intel® Sigma protocol that establishes the trustworthiness of IoT devices and may authenticate a device identity. If Trusted Device A 205 does not satisfy the threshold, Trusted Device B 255 may decline populating the registry and index of trusted device the available service hosted on Trusted Device A 205. If Trusted Device B 255 verifies the credentials of Trusted Device A, then at 312, Trusted Device B 255 indexes the list of shared services in local registry 285. In one or more embodiments, the basis of trust, such as the security features or services that satisfy the trust policy, may be cached by one or both of the trusted devices involved in discovery. In one or more embodiments, caching the basis of trust allows a trusted device to provide redundancy throughout the trusted network, which may allow for trusted discovery of services when a trusted device is offline but the basis for trusted discovery of the trusted device is cached in an available device that may be discovered.

At 314, Trusted Device B transmits an acceptance message 320 to Trusted Device A 205. In one or more embodiments, at 316, Trusted Device B 255 includes a list of services available to Trusted Device B 255. The list of services may include services hosted by Trusted Device B 255, as well as services hosted by other remote trusted devices which have been made available to Trusted Device B 255. For example, the list of available services may include the contents of the local registry 285.

At 322, Trusted Device A 205 may update its list of available services in local registry 235. Trusted Device A 205 and Trusted Device B 255, are now both aware of all available services in the trusted network that each are aware of. Although not depicted, in the case that Trusted Device B 255 were to leave the trusted network, Trusted Device B 255 would send a leave message to Trusted Device A 205. In response to receiving the leave message, Trusted Device A 205 would remove the services hosted by Trusted Device B 255 from a local registry for Trusted Device A 205.

Figure 4:
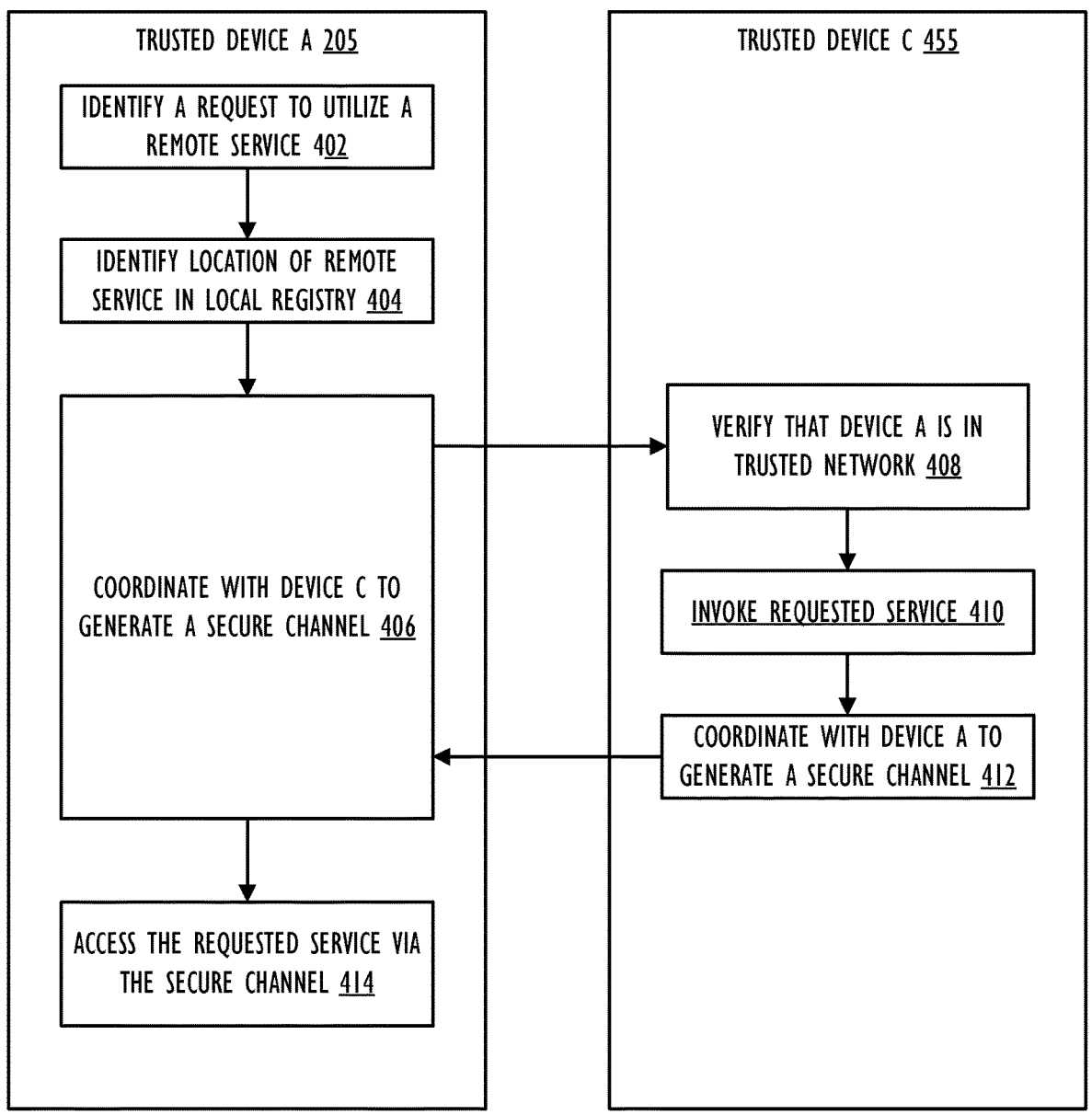
FIG. 4 is a flow diagram illustrating a technique for utilizing a remote service in a trusted network according to one or more embodiments.

FIG. 4 is a flow diagram illustrating a technique for utilizing a remote service in a trusted network according to one or more embodiments. FIG. 4 illustrates updating a local registry during the process of expanding the trusted network, according to one or more embodiments. FIG. 4 includes Trusted Device A 205 and Trusted Device C 455. Trusted Device A 205 is depicted in less detail as in FIG. 2, however reference may be made to FIG. 2 for clarity. Although each action is depicted as occurring in one or Trusted Device A 205 and Trusted Device C 455, in one or more embodiments, each action is performed by a trusted network arbiter in the respective device.

The flow diagram begins at 402, where Trusted Device A 205 identifies a request to utilize a remote service. In one or more embodiments, the request may be received from one of the applications 225 by the TNA 230.

The flow diagram continues at 404, and Trusted Device A 205 identifies the location of the requested remote service in the local registry. For example, TNA 230 may access registry 235 to determine that the requested service is hosted by Trusted Device C 455. In one or more embodiments, the requested service and its location may be indexed during the trusted discovery of Trusted Device C 455, or by another trusted device in the trusted network that is aware of the services hosted by Trusted Device C 455. That is, referring back to FIG. 3, at 316, Trusted Device B 255 may be aware of the services hosted by Trusted Device C 455 during a previous trusted discovery.

The flow diagram continues at 406, and Trusted Device A 205 coordinates with Trusted Device C 455 to generate a secure channel. In one or more embodiments, as part of coordinating to generate a secure channel, at 408, Trusted Device C 455 verifies that Device A is in the trusted network. In one or more embodiments, the verification process also includes verifying that Trusted Device A 205 satisfies a security threshold such that Trusted Device A 205 may host or utilize shared services in the trusted network. In response to verifying Trusted Device A, at 410, Trusted Device C 455 invokes the requested service, and at 412, coordinates with Device A 205 to generate the secure channel. Once the secure channel is generated, at 414, Trusted Device A 205 may utilize the requested service on Trusted Device C 455 via the secure channel.

Figure 5:
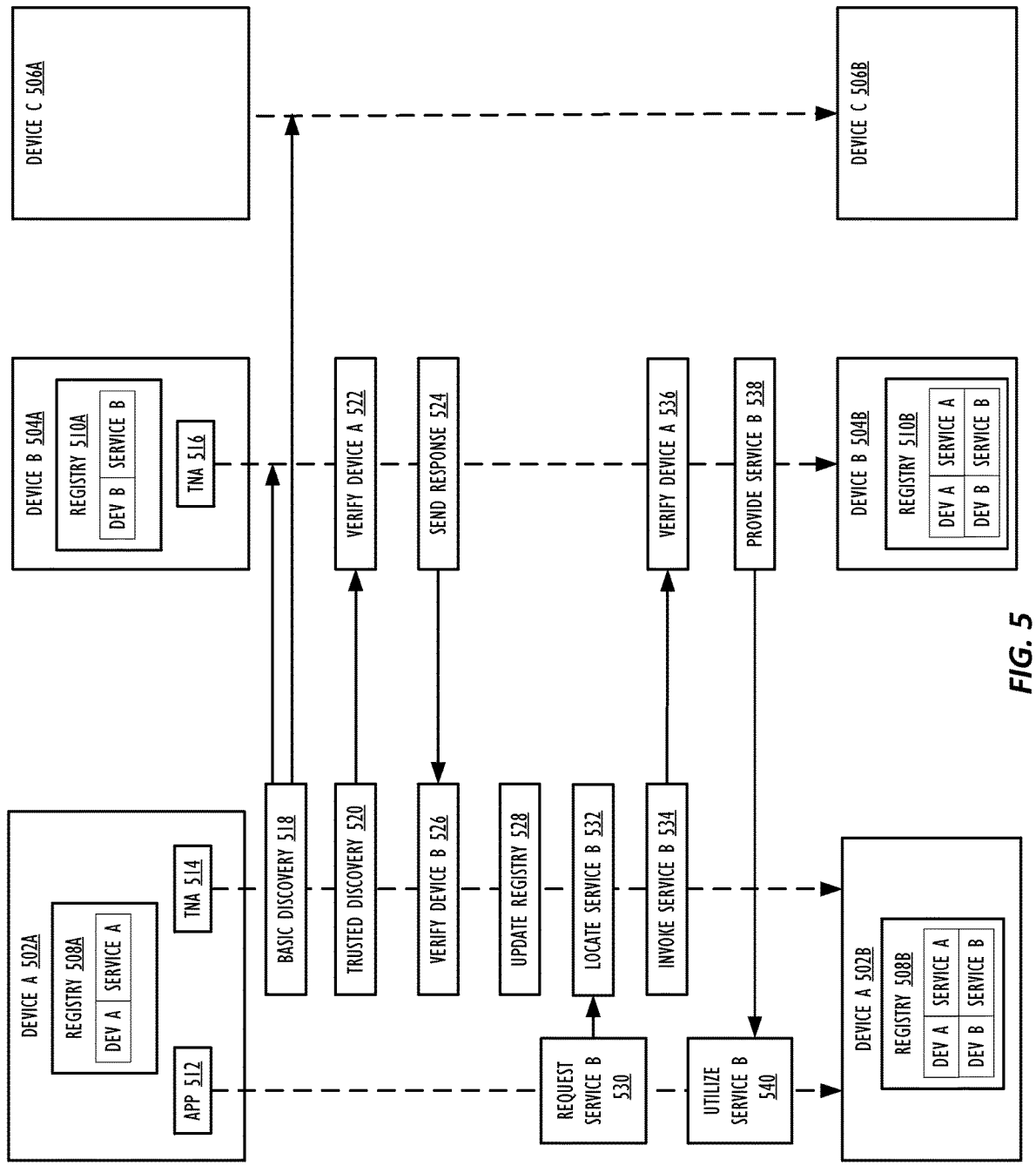
FIG. 5 is a flow diagram illustrating sharing services across a trusted network.

FIG. 5 is a flow diagram illustrating sharing services across a trusted network. FIG. 5 depicts an example flow diagram of data flow throughout a network. For purposes of the example, the network includes Device A 502, Device B 504, and Device C 506. The flow diagram illustrates the various device prior to the data flow as Device A 502A, Device B 504A, and Device C 506A, and following the data flow as Device A 502B, Device B 504B, and Device C 506B.

Prior to the beginning of the flow diagram, Device A 502A includes a registry 508A that indicates that Service A is hosted on Device A. Device A 502A also includes various applications 512, and a TNA 514. Device B 504A includes a registry 510A that indicates that Service B is hosted on Device B. Device B 504A also includes a TNA 516. Device C 506A does not include anything of note for the current example, but is notably devoid of a TNA. However, any of Device A 502A, Device B 504A, and Device C 506A may include additional features that have been omitted for clarity.

The flow diagram begins at 518, and TNA 514 of Device A 502 initiates a basic discovery process by pinging Device B 504 and Device C 506. That is, Device A 502 discovers Device B 504 and Device C 506 through regular discovery. In addition, as part of basic discovery 518, Device A 502 may determine that Device B 504 supports trusted discovery, and is a trusted device. In one or more embodiments, Device B 504 may be identified as a trusted device because Device B 504 includes TNA 516, or because Device B 504 includes security services that satisfy a particular threshold of trustworthiness.

Upon determining that Device B 504 is a trusted device, TNA 514 initiates trusted discovery at 520. Device A 502 may use information received during basic discovery to define a multicast or unicast channel to perform trusted discovery. In one or more embodiments, trusted discovery allows TNA 514 to identify particular services hosted by trusted devices in a trusted network. In one or more embodiments, the discovery message sent during trusted discovery may include data identifying that Device A 502 hosts Service A, as depicted in registry 508A. At 522, Device B 504 receives the discovery message and verifies Device A 502. In one or more embodiments, Device A 502 opens an attested secure channel with Device B 504 to allow the devices to verify each other. Device B 504 may verify Device A 502 by determining that Device A 502 satisfies a particular threshold of trustworthiness which may be determined based on Device A 502 including a TNA, or based on Device A 502 including sufficient security services to be considered sufficiently trustworthy to Device B 504 to host shared services. Verifying Device A 502 indicates that Device A 502 is executing a secure environment. In response to verifying Device A 502 at 522, Device B 504 may index the services included in the discovery message in a local registry as depicted in registry 510B. At 526, Device B 504 sends a response acceptance message to Device A 502. In one or more embodiments, the acceptance message includes data identifying services hosted on Device B 504. In addition, the response may also include data identifying services hosted on other trusted network devices in the network. During the verification process, Device A 502 and Device B 504 may also use any asymmetric cryptography method to agree upon a shared key which can be used for further communications between the TNAs.

At 524, Device A 502 receives the response acceptance message from Device B 504. In one or more embodiments, Device A 502 may verify Device B 504. Device A 502 may verify Device B 504 by determining that Device B 504 satisfies a particular threshold of trustworthiness which may be determined based on Device B 504 including a TNA, or based on Device A 502 including security services to be considered sufficiently trustworthy to Device B 504 to host shared services. In response to verifying Device A 502, Device B 504 may index the services included in the discovery message in a local registry, as depicted in registry 508B.

The example flow diagram also includes, at 530, application 512 requesting a remote service, such as Service B. At 532, TNA 514 locates Service B. For example, TNA 514 may query registry 508B to identify the location of Service B. As depicted in registry 508B, Service B is hosted on Device B 504. At 534, TNA 514 invokes Service B by requesting access from Device B 504. At 536, Device B 504 verifies Device A 502 to determine that Device A 502 is sufficiently secure to provide access to the service. In response to verifying Device A 502, at 538, provides Service B to Device A 502. In one or more embodiments providing Service B to Device A 502 includes generating a secure channel between Device B 504 and Device A 502, and providing access via the secure channel. At 540, Device A 502 may utilize Service B via the secure channel.

Figure 6:
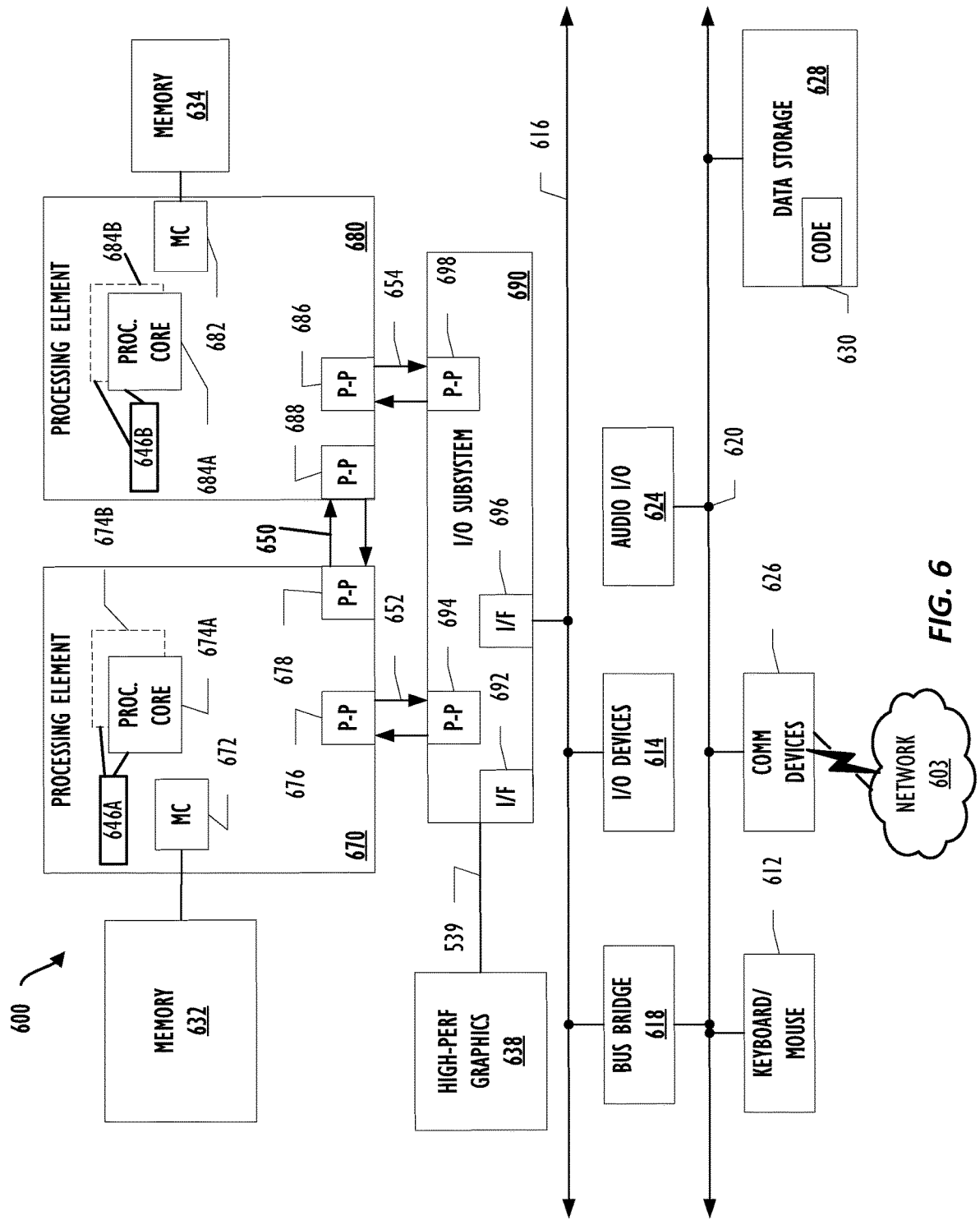
FIG. 6 is a diagram illustrating a computing device for use with techniques described herein according to one embodiment.

Referring now to FIG. 6, a block diagram illustrates a programmable device 600 that may be used within a trusted device, such as Trusted Device A 205 or Trusted Device B 255, in accordance with one or more embodiments. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-5. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. Also, the elements of FIG. 6 may alternatively be partitioned using more or fewer integrated chips than illustrated in FIG. 6.

Figure 7:
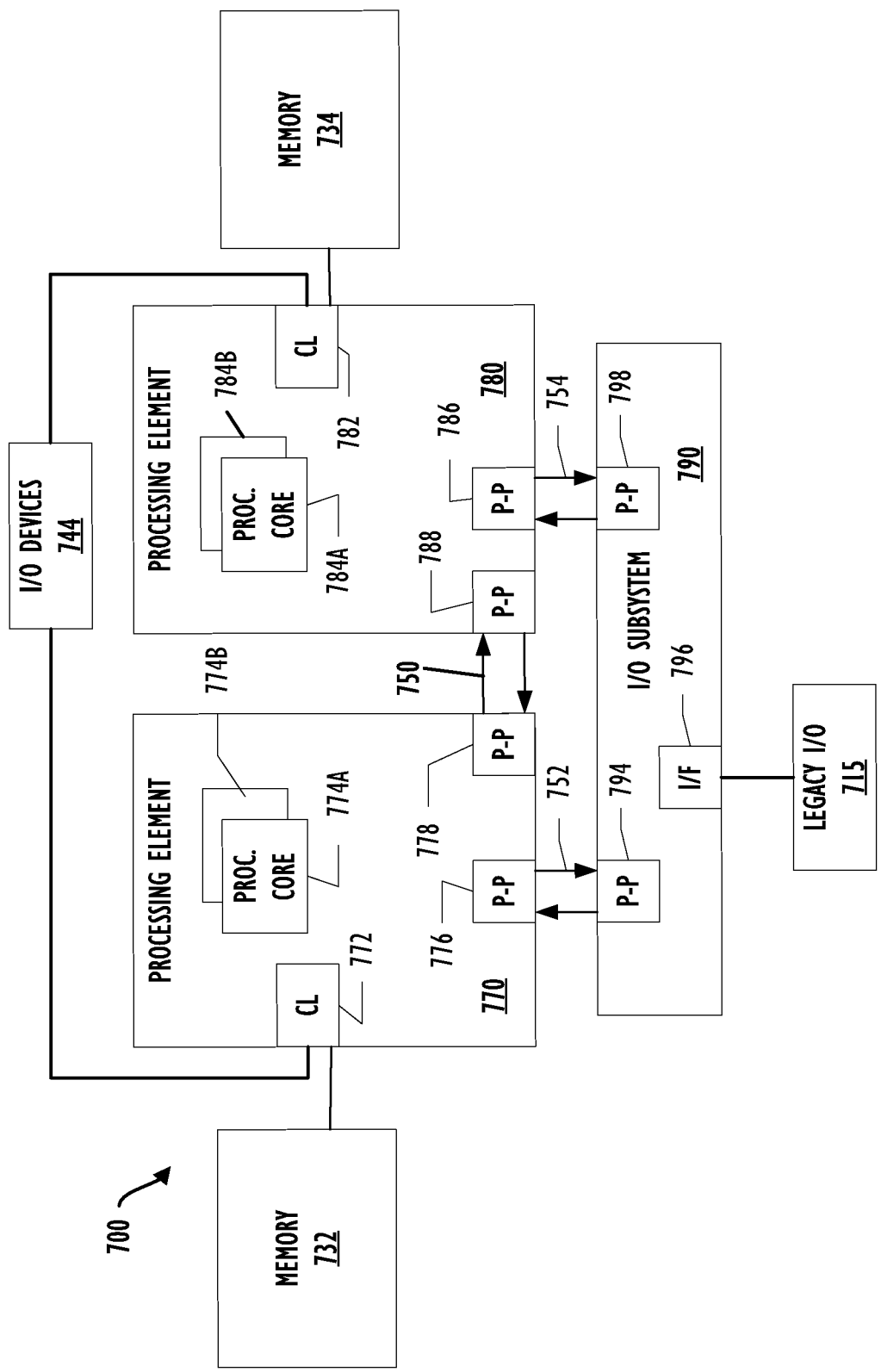
FIG. 7 is a block diagram illustrating a computing device for use with techniques described herein according to another embodiment.

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 784B. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 6 and 7 are schematic illustrations of embodiments of programmable devices which may be utilized to implement various embodiments discussed herein. Various components of the programmable devices depicted in FIGS. 6 and 7 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed by a processor cause a machine to: receive, by a local trusted device, a message from a first remote trusted device identifying a first service hosted by the first remote trusted device, wherein the local trusted device and the first remote trusted device are in a trusted network; and index, by the local trusted device, the first service in a registry comprising services available to the local trusted device and a location of each service, wherein the registry is local to the local trusted device.

In Example 2, the subject matter of Example 1 can optionally include instructions that further cause a machine to identify a request on the local device to utilize the first service; generate a secure channel between the local device and the first remote trusted device; and access the first service through the secure channel.

In Example 3, the subject matter of Example 1 or 2 can optionally include wherein the first service is a security service.

In Example 4, the subject matter of Example 1 can optionally include instructions that further cause a machine to send a response to the first remote trusted device identifying the services available to the local trusted device, wherein the first remote trusted device indexes the services available to the local trusted device in a registry local to the first remote trusted device.

In Example 5, the subject matter of Example 1 can optionally include instructions that further cause a machine to receive, by the local trusted device, a leave message from the first remote trusted device; and in response to receiving the leave message, remove the first service from the registry.

In Example 6, the subject matter of Example 1 or 2 can optionally include wherein the services available to the local trusted device comprise a second service hosted on a second remote trusted device.

In Example 7, the subject matter of Example 1 can optionally include wherein the trusted network is a network enclave in a larger network, and wherein a network device that is not in the trusted network is prevented from accessing the services.

Example 8 includes a machine readable medium, on which are stored instructions, comprising instructions that when executed by a processor cause a machine to: identify, by a local device, a remote trusted device; send, by the local device, a discovery message to the remote trusted device; receive an acceptance message from the remote trusted device, wherein the acceptance message comprises data identifying a first service hosted on the remote trusted device; and index, by the local trusted device, the first service in a registry comprising services available to the local trusted device and a location of each service available, wherein the registry is local to the local trusted device.

In Example 9, the subject matter of Example 8 can optionally include instructions that further cause a machine to send, by the local device, a response to the first remote trusted device identifying the services available to the local trusted device, wherein the first remote trusted device indexes the services in a registry local to the first remote trusted device.

In Example 10, the subject matter of Example 8 or 9 can optionally include wherein the services available to the local trusted device comprise a second service hosted on a second remote trusted device.

In Example 11, the subject matter of Example 10 can optionally include instructions that further cause a machine to identify a request on the local device to utilize the second service; generate a secure channel between the local device and the second remote trusted device; and provide access to the second service through the secure channel.

In Example 12, the subject matter of Example 8 or 9 can optionally include instructions that further cause a machine to identify a request on the local device to utilize the first service; generate a secure channel between the local device and the first remote trusted device; and provide access to the first service through the secure channel.

In Example 13, the subject matter of Example 8 can optionally include instructions that further cause a machine to receive, by the local trusted device, a leave message from the first remote trusted device; and in response to receiving the leave message, remove the first service from the registry.

Example 14 includes a method for organizing a trusted network, comprising identifying, by a local device, a first remote trusted device; sending, by the local device, a discovery message to the first remote trusted device; receiving an acceptance message from the first remote trusted device, wherein the acceptance message comprises data identifying a first service hosted on the first remote trusted device; and indexing, by the local trusted device, the first service in a registry comprising services available to the local trusted device and a location of each service available, wherein the registry is local to the local trusted device.

In Example 15, the subject matter of Example 14 can optionally include sending, by the local device, a response to the first remote trusted device identifying the services available to the local trusted device, wherein the first remote trusted device indexes the services in a registry local to the first remote trusted device.

In Example 16, the subject matter of Example 14 or 15 can optionally include wherein the services available to the local trusted device comprise a second service hosted on a second remote trusted device.

In Example 17, the subject matter of Example 16 can optionally include identifying a request on the local device to utilize the second service; generating a secure channel between the local device and the second remote trusted device; and providing access to the second service through the secure channel.

In Example 18, the subject matter of Example 14 or 15 can optionally include identifying a request on the local device to utilize the first service; generating a secure channel between the local device and the first remote trusted device; and providing access to the first service through the secure channel.

In Example 19, the subject matter of Example 14 can optionally include receiving, by the local trusted device, a leave message from the first remote trusted device; and in response to receiving the leave message, removing the first service from the registry.

Example 20 includes a computer system for organizing a trusted network, comprising one or more processors; and a memory, coupled to the one or more processors, on which are instructions are stored which, when executed by the one or more processors cause the one or more processors to identify, by a local device, a remote trusted device; send, by the local device, a discovery message to the remote trusted device; receive an acceptance message from the remote trusted device, wherein the acceptance message comprises data identifying a first service hosted on the remote trusted device; and index, by the local trusted device, the first service in a registry comprising services available to the local trusted device and a location of each service available, wherein the registry is local to the local trusted device.

In Example 21, the subject matter of Example 20 can optionally include instructions that further cause the one or more processors to send, by the local device, a response to the first remote trusted device identifying the services available to the local trusted device, wherein the first remote trusted device indexes the services in a registry local to the first remote trusted device.

In Example 22, the subject matter of Example 20 or 21 can optionally include wherein the services available to the local trusted device comprise a second service hosted on a second remote trusted device.

In Example 23, the subject matter of Example 22 can optionally include instructions that further cause the one or more processors to identify a request on the local device to utilize the second service; generate a secure channel between the local device and the second remote trusted device; and provide access to the second service through the secure channel.

In Example 24, the subject matter of Example 20 or 21 can optionally include instructions that further cause the one or more processors to identify a request on the local device to utilize the first service; generate a secure channel between the local device and the first remote trusted device; and provide access to the first service through the secure channel.

In Example 25, the subject matter of Example 20 can optionally include instructions that further cause the one or more processors to receive, by the local trusted device, a leave message from the first remote trusted device; and in response to receiving the leave message, remove the first service from the registry.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore should be determined with reference to the appended claims, along with the full scope of equivalents to which such claims are entitled.

What is claimed is:

1. A storage device or storage disk comprising instructions that, when executed by one or more processors, cause the one or more processors to at least:
   during basic discovery, provide information from a local device to a first remote trusted device, the information to indicate the local device supports trusted discovery and to establish the local device as a second remote trusted device;
   during the trusted discovery, access, by the local device a trusted discovery message received from the first remote trusted device, the trusted discovery message to identify: (a) security credentials for the first remote trusted device, (b) a first service hosted by the first remote trusted device, and (c) a second service hosted by a third remote trusted device;
   verify the security credentials for the first remote trusted device; and
   in response to verifying the security credentials for the first remote trusted device:
      add the first remote trusted device to a trusted network including the local device; and
      index, by the local device the first service and the second service in a registry including third services available to the local device and corresponding locations of the services, the registry to be local to the local device, and the third services in the registry to be opaque to devices that are not part of the trusted network.

2. The storage device or storage disk of claim 1, wherein the instructions, when executed, further cause the one or more processors to:
   identify a request on the local device to utilize the first service;
   generate a secure channel between the local device and the first remote trusted device; and
   access the first service through the secure channel.

3. The storage device or storage disk of claim 1, wherein the first service is a security service.

4. The storage device or storage disk of claim 1, wherein the instructions, when executed, further cause the one or more processors to:
   send a response to the first remote trusted device identifying the third services available to the local device, the first remote trusted device to index the third services available to the local device in a second registry local to the first remote trusted device.

5. The storage device or storage disk of claim 1, wherein the instructions, when executed, further cause the one or more processors to:
   access, by the local device, a leave message received from the first remote trusted device; and
   in response to the leave message, remove the first service from the registry.

6. The storage device or storage disk of claim 1, wherein at least one of the third services available to the local device is hosted on a fourth remote trusted device.

7. The storage device or storage disk of claim 1, wherein the trusted network is a network enclave in a larger network, and a network device that is not in the trusted network is to be prevented from accessing the third services.

8. A storage device or storage disk comprising instructions that, when executed by one or more processors, cause the one or more processors to at least:
   during basic discovery, identify, by a local device, a first remote trusted device that supports trusted discovery;
   during the trusted discovery, send a trusted discovery message from the local device to the first remote trusted device, the trusted discovery message to identify: (a) security credentials for the local device, (b) a first service hosted by the local device, and (c) a second service hosted by a second remote trusted device;
   access an acceptance message received from the first remote trusted device, the acceptance message to indicate an acceptance of the local device to a trusted network including the first remote trusted device, and the acceptance message to include data identifying a third service hosted on the first remote trusted device; and
   index, by the local device, the third service in a registry including fourth services available to the local device and corresponding locations of the fourth services, the registry to be local to the local device, and the fourth services in the registry to be opaque to devices that are not part of the trusted network.

9. The storage device or storage disk of claim 8, wherein the instructions, when executed, further cause the one or more processors to:
   send, by the local device, a response to the first remote trusted device identifying the fourth services available to the local device, the first remote trusted device to index the fourth services in a second registry local to the first remote trusted device.

10. The storage device or storage disk of claim 9, wherein at least one of the fourth services available to the local device is hosted on a third remote trusted device.

11. The storage device or storage disk of claim 10, wherein the instructions, when executed, further cause the one or more processors to:
    identify a request on the local device to utilize the at least one of the fourth services;
    generate a secure channel between the local device and the third remote trusted device; and
    provide access to the at least one of the fourth services through the secure channel.

12. The storage device or storage disk of claim 8, wherein the instructions, when executed, further cause the one or more processors to:
    identify a request on the local device to utilize the first service;

generate a secure channel between the local device and the first remote trusted device; and provide access to the first service through the secure channel.

13. The storage device or storage disk of claim 8, wherein the instructions, when executed, further cause the one or more processors to:

access, by the local device, a leave message received from the first remote trusted device; and in response to the leave message, remove the first service from the registry.

14. A method of organizing a trusted network, the method comprising:

during basic discovery, identifying, by a local device, a first remote trusted device that supports trusted discovery;

during the trusted discovery, sending, by the local device, a trusted discovery message to the first remote trusted device, the trusted discovery message to include: (a) security credentials for the local device, (b) a first service hosted by the local device, and (c) a second service hosted by a second remote trusted device;

accessing an acceptance message received from the first remote trusted device, the acceptance message to indicate an acceptance of the local device to a trusted network including the first remote trusted device, and the acceptance message to include data identifying a third service hosted on the first remote trusted device; and indexing, by the local device, the third service in a registry including fourth services available to the local device and corresponding locations of the fourth services, the registry is local to the local device, and the fourth services in the registry to be opaque to devices that are not part of the trusted network.

15. The method of claim 14, further including:

sending, by the local device, a response to the first remote trusted device identifying the fourth services available to the local device, the first remote trusted device to index the fourth services in a second registry local to the first remote trusted device.

16. The method of claim 14, wherein at least one of the fourth services available to the local device is hosted on a third remote trusted device.

17. The method of claim 16, further including:

identifying a request on the local device to utilize the at least one of the fourth services;

generating a secure channel between the local device and the third remote trusted device; and providing access to the at least one of the fourth services through the secure channel.

18. The method of claim 14, further including:

identifying a request on the local device to utilize the first service;

generating a secure channel between the local device and the first remote trusted device; and providing access to the first service though the secure channel.

19. The method of claim 14, further including:

accessing, by the local device, a leave message received from the first remote trusted device; and in response to receiving the leave message, removing the third service from the registry.

20. A computer system to organize a trusted network, the computer system comprising:

one or more hardware processors; and memory, in circuit with the one or more hardware processors, the memory including instructions which, when executed by the one or more hardware processors, cause the one or more hardware processors to at least:

during basic discovery, identify a first remote trusted device that supports trusted discovery;

during the trusted discovery, send a trusted discovery message to the first remote trusted device, the trusted discovery message to include: (a) security credentials for the computer system, (b) a first service hosted by the computer system, and (c) a second service hosted by a second remote trusted device;

access an acceptance message received from the first remote trusted device, the acceptance message to indicate an acceptance of the computer system to the trusted network, the trusted network including the first remote trusted device, and the acceptance message to include data identifying a third service hosted on the first remote trusted device; and index the third service in a registry including fourth services available to the computer system and corresponding locations of the fourth services, the registry to be local to the computer system, and the fourth services in the registry to be opaque to devices that are not part of the trusted network.

21. The computer system of claim 20, wherein the instructions further cause the one or more hardware processors to:

send a response to the first remote trusted device, the response to identify the fourth services available to the computer system, the first remote trusted device to index the fourth services in a second registry local to the first remote trusted device.

22. The computer system of claim 20, wherein at least one of the fourth services available to the computer system is hosted on a third remote trusted device.

23. The computer system of claim 22, wherein the instructions further cause the one or more hardware processors to:

identify a request to utilize the at least one of the fourth services;

generate a secure channel between the computer system and the third remote trusted device; and provide access to the at least one of the fourth services through the secure channel.

24. The computer system of claim 20, wherein the instructions further case the one or more hardware processors to:

identify a request to utilize the first service;

generate a secure channel between the computer system and the first remote trusted device; and provide access to the first service through the secure channel.

25. The computer system of claim 20, wherein the instructions further cause the one or more hardware processors to:

access a leave message received from the first remote trusted device; and in response to the leave message, remove the third service from the registry.

* * * * *

UNITED STATES PATENT AND TRADEMARK OFFICE
CERTIFICATE OF CORRECTION

PATENT NO. : 10,673,852 B2  
APPLICATION NO. : 14/581333  
DATED : June 2, 2020  
INVENTOR(S) : Smith et al.

Page 1 of 1

It is certified that error appears in the above-identified patent and that said Letters Patent is hereby corrected as shown below:

In the Claims  
Column 1 Line 50, Claim 24:  
Replace "case" with --cause--

Signed and Sealed this  
Twelfth Day of January, 2021

Andrei Iancu  
*Director of the United States Patent and Trademark Office*